United States Patent [19]

Nakai et al.

[11] Patent Number: 5,990,971
[45] Date of Patent: *Nov. 23, 1999

[54] PICTURE-DISPLAY-REGION DISCRIMINATING APPARATUS

[75] Inventors: Kenzo Nakai; Yukihiko Yamamoto, both of Kanagawa, Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/665,880

[22] Filed: Jun. 19, 1996

[30] Foreign Application Priority Data

Jun. 20, 1995 [JP] Japan ................................. 7-153193

[51] Int. Cl.⁶ ................................................. H04M 5/46
[52] U.S. Cl. ......................... 348/558; 348/556; 348/553
[58] Field of Search ..................................... 348/558, 556, 348/445, 717, 913, 557, 553; 358/11, 153; H04N 5/46

[56] References Cited

U.S. PATENT DOCUMENTS

| | | | |
|---|---|---|---|
| 3,947,631 | 3/1976 | Rhee et al. ........................... | 178/7.3 R |
| 4,622,577 | 11/1986 | Reitmseier et al. ..................... | 358/11 |
| 5,249,049 | 9/1993 | Kranawetter et al. ................... | 348/473 |
| 5,309,234 | 5/1994 | Kranawetter et al. ................... | 348/473 |
| 5,365,276 | 11/1994 | Imai et al. ............................... | 348/556 |
| 5,486,871 | 1/1996 | Filliman et al. ......................... | 348/558 |
| 5,488,432 | 1/1996 | Guillon et al. .......................... | 348/717 |
| 5,528,305 | 6/1996 | Kim ......................................... | 348/445 |
| 5,539,425 | 7/1996 | Kamaguchi et al. ..................... | 345/77 |
| 5,621,469 | 4/1997 | Monta et al. ............................ | 348/445 |
| 5,686,970 | 11/1997 | Tani et al. ............................... | 348/558 |
| 5,719,636 | 2/1998 | Ishii et al. ............................... | 348/558 |
| 5,760,840 | 6/1998 | Tani et al. ............................... | 348/558 |

OTHER PUBLICATIONS

Robert L. Hartwig, Basic TV Technology, Second Edition p. 168, Jan. 1, 1995.

*Primary Examiner*—John K. Peng
*Assistant Examiner*—Jean W. Désir
*Attorney, Agent, or Firm*—Fromer, Lawrence & Haug, LLP; William S. Frommer; Dennis M. Smid

[57] ABSTRACT

A picture-display-region discriminating apparatus comprising a device for setting a number of picture detection regions on a display screen of a television receiver, a detecting device for detecting a level of a video signal corresponding to each picture detection region by utilizing two reference levels, and a device for determining whether or not a picture exists in each picture detection region based on detection results from the detecting device. One of the reference levels utilized by the detecting device is a black level of a luminance signal of the video signal and the other reference level utilized therewith is a white level of the luminance signal of the video signal.

6 Claims, 4 Drawing Sheets

(Timing Signal)  (One Vertical Sync. Period)

(Output Signal)

PICTURE-DISPLAY-REGION DISCRIMINATING APPARATUS

BACKGROUND OF THE INVENTION

1. Field of the Invention

The present invention relates to a television receiver and particularly to a picture-display-region discriminating circuit of a so-called wide-screen television receiver for discriminating whether or not any picture is displayed on a specific region where a picture or a letter is to be displayed.

2. Description of the Related Art

There have been increased a video software obtained by converting a movie having a rectangular picture (also referred to as a wide screen) called a Vista Vision size or Cinema Scope size into a picture with an aspect ratio of 4:3 to be displayed on a screen of a television receiver of a standard system (NTSC system, PAL system, SECAM system and so on), and a broadcasting program having a picture obtained by converting a broadcasting signal of a high-definition television system used for a television receiver of a wide screen corresponding to a frame size of an aspect ratio of 16:9 into a signal used for a television receiver of the standard television system.

There is available on a market a television receiver called a wide-screen television receiver having a display screen with an aspect ratio of 16:9 so as to display pictures of these video softwares for the wide screen on the screen with using 525 scanning lines similarly to that of the standard television system.

This wide-screen television receiver is provided with various display modes used for a viewer to watch such video software or broadcasting program on the television receiver with an optimum frame size of such video software or broadcasting program. The viewer operates a remote controller or the like to select a preferable display mode.

For example, the wide-screen television receiver provides the following display modes.

(1) The first display mode is used when a rectangular picture of a video software is displayed on the screen of the wide-screen television receiver; the displayed picture is enlarged in the frame-height direction with reference to a center thereof in accordance with a ratio of a frame height of a standard frame size to that of a wide frame size, thereby a zoom picture being enlarged so as to occupy a substantially entire wide screen and displayed thereon.

(2) The second display mode is used when a letter-box picture of a video software whose picture display region is different depending upon a video software and a picture of a foreign movie with a superimposed dialogue is displayed on the screen of the wide-screen television receiver; since it is impossible to fix a reference point of an enlargement of the displayed picture in the frame-height direction, the picture is allowed to scroll in the frame-height direction until only an upper or lower end portion scrolls off the screen.

(3) The third display mode is used when a picture of the standard system with an aspect ratio of 4:3 is displayed on the wide screen so as to occupy an entire screen in the frame-height direction; in this case, portions where no picture is displayed are produced on both of left and right ends of the wide screen, which prevents the wide screen from being utilized effectively. Accordingly, in this case, a central portion of the picture is not processed but both of left and right end portions thereof are enlarged in the frame-width direction, thereby a rectangular picture being displayed on the entire wide screen.

However, it is not easy for the viewer to select an optimum display mode for the video software or broadcasting program.

A system for an automatic selection of the display mode is considered, wherein a broadcasting side or a software production side inserts an identification information indicative of a kind of a software into a vertical blanking period of a video signal and a television receiver automatically switches a display mode based on the identification information. However, realization of the system for the automatic selection of the display mode encounters problems, e.g., requirement of preparation on all the broadcasting sides or software production sides and manufacturing costs of a television receiver of such system. Therefore, the system will not be put into practice in the near future.

In order to solve the above problems, after studying distribution of pictures on the screen of the television receiver or the like, the same assignee has already developed a low-cost television receiver for solving the above problems and disclosed it in Japanese patent application (filed on Aug. 16, 1994). According to this application, as shown in FIG. 1, stripe picture detection regions a, b are respectively set on an upper portion and a center portion of the picture screen, and small picture detection regions c, d, e, f, are set on a lower portion of the picture screen. It is detected whether or not any picture is displayed on each of the above six picture detection regions a to f. Based on the detection result, it is discriminated which kind of the picture the video software has. Based on the discriminated result, an optimum display mode for the video software is selected.

However, such picture-display-region discriminating system of the above television receiver encounters the following problems.

(1) Only six picture detection regions are provided on the picture screen. The number of the picture detection regions is not enough. If the video softwares having many kinds of picture sizes are distributed in the future, then it will be impossible with flexibility to discriminate all kinds of the video softwares with using only the above six picture detection regions. Moreover, for example, if a level of the video signal corresponding to a center portion of a picture screen is changed considerably, then the discrimination may be erroneous.

(2) Since the picture-display-region discriminating system employs only one reference black level, the discrimination result is presented as one of two values obtained from discriminating whether or not the level of the video signal corresponding to each of the picture detection region is equal to or smaller than the black level. As a result, if the black level itself is changed, it may lead to erroneous discrimination.

(3) Since the reference level (black level) is fixed, if the black level is changed to a higher level, then a portion where no picture is displayed is erroneously discriminated as a portion where any picture is displayed.

Accordingly, the above picture-display-region discriminating system encounters the problems to be solved for precisely discriminating whether or not any picture is displayed on each of the picture detection regions a to f.

SUMMARY OF THE INVENTION

It is an object of the present invention to provide a picture-display-region discriminating apparatus which can accurately determine, with reference to a black level and a white level, whether or not any picture is displayed on each of picture detection regions set so as to cover an almost entire screen of a television rece/iver.

According to an aspect of the present invention, a picture-display-region discriminating apparatus includes a picture detection region setting means for setting picture detection regions so that the picture detection regions should cover an entire display screen of a television receiver, a detecting means for detecting a level of a video signal corresponding to each of the picture detection regions, and a determining means for determining whether or not there is any picture on each of the picture detection regions, based on a detection data from the detecting means. The detecting means detects the level of the video signal with reference to a black level and a white level of a luminance signal of the video signal.

DESCRIPTION OF THE PREFERRED EMBODIMENT

A picture-display-region discriminating apparatus according to an embodiment of the present invention will hereinafter be described.

Figure 1:
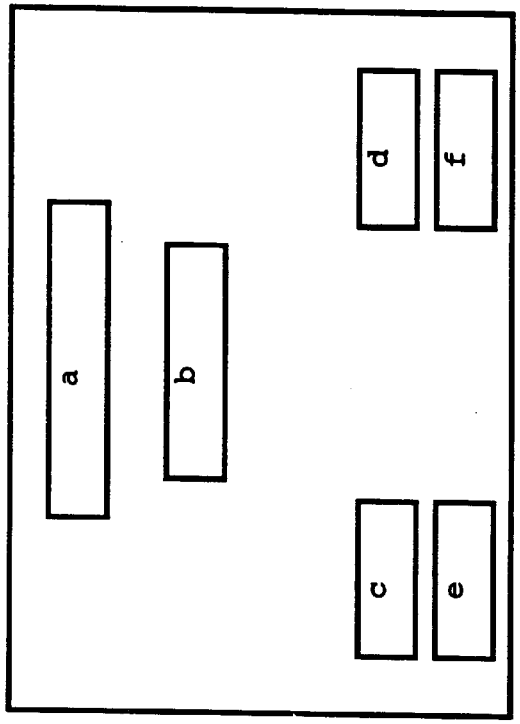
FIG. 1 is a diagram used to explain a setting arrangement of picture detection regions.
Figure 2:
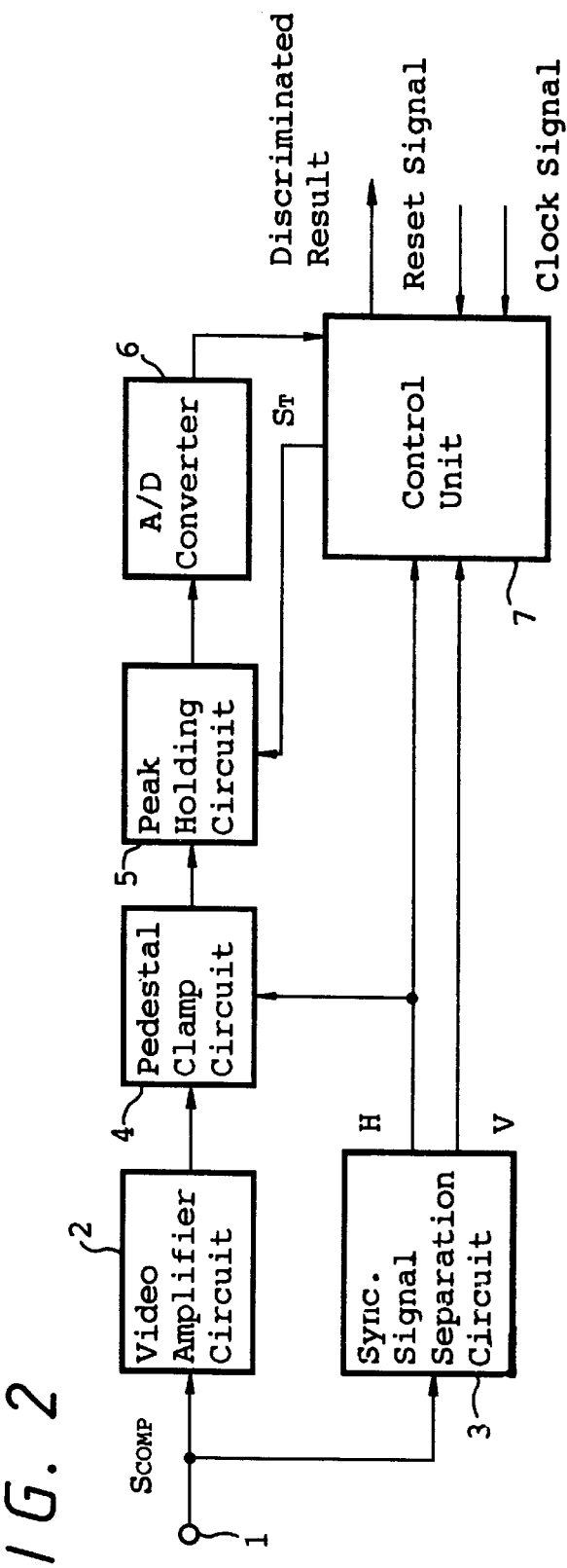
FIG. 2 is a block diagram showing an arrangement of a picture-display-region discriminating apparatus according to an embodiment of the present invention.

As shown in FIG. 2, the picture-display-region discriminating apparatus according to the present invention includes an input terminal 1, a video amplifier 2, a synchronizing signal separation circuit 3, a pedestal clamp circuit 4, a peak holding circuit 5, an A/D converter 6, and a microcomputer (or a microcontroller) 7.

Figure 3:
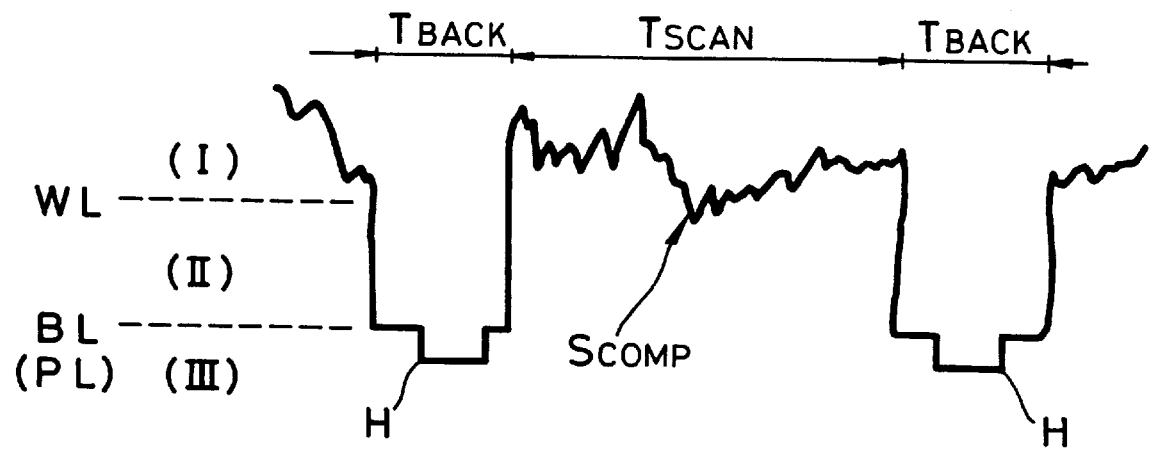
FIG. 3 is a diagram used to explain a ternary determination according to the embodiment shown in FIG. 2.

The input terminal 1 is supplied with a known composite video signal $S_{COMP}$ shown in FIG. 3. In FIG. 3, reference symbols $T_{SCAN}$, $T_{BACK}$, and H represent a horizontal scanning period, a horizontal blanking period, and a horizontal synchronizing signal, respectively.

In FIG. 3, broken lines WL, BL and PL represent a white level, a black level, and a pedestal level (a level of a blanking signal), respectively. The black level BL is set at a level substantially equal to that of the pedestal level PL.

In FIG. 3, reference symbols I, II, III respectively represent a region where a luminance levels of a video signal is higher than the white level, a region where a luminance level of a video signal is between white and black levels, and a region where a luminance level of a video signal is lower than the black level.

The composite video signal $S_{COMP}$ input to the input terminal 1 is supplied to the video amplifier 2 and the synchronizing signal separation circuit 3.

The video signal amplifier 2 is formed of a transistor or the like and amplifies the composite video signal $S_{COMP}$ to output it to the pedestal clamp circuit 4.

The synchronizing signal separation circuit 3 extracts a horizontal synchronizing signal H and a vertical synchronizing signal V from the composite video signal $S_{COMP}$. The synchronizing signal separation circuit 3 supplies the extracted horizontal and vertical synchronizing signals H, V to the microcomputer 7 and supplies the horizontal synchronizing signal H to the pedestal clamp circuit 4.

The pedestal clamp circuit 4 has a function to set a pedestal level PL of the composite video signal $S_{COMP}$ output from the video amplifier 2 at the same level at every timing of the horizontal synchronizing signal H.

The reason for this operation is that, since a DC component of the composite video signal $S_{COMP}$ is lost when the video amplifier 2 amplifies the composite video signal $S_{COMP}$, pedestal levels PL are prevented from being different depending upon the composite video signals $S_{COMP}$ representing a bright picture and a dark picture. For example, the pedestal clamp circuit 4 restores a DC component to set the pedestal levels of the composite video signal $S_{COMP}$ at the same level.

Then, the pedestal clamp circuit 4 outputs the composite video signal $S_{COMP}$ to the peak holding circuit 5.

The peak holding circuit 5 is supplied with the composite video signal $S_{COMP}$ with its constant pedestal level PL as described above. As described in detail later on, the peak holding circuit 5 is controlled based on a timing signal $S_T$ output from the microcomputer 7 and has a function to detect a maximum value (peak value) of the video signal corresponding to a picture detection region and to output a signal indicative of the maximum value.

The A/D converter 6 converts the signal indicative of the peak value output from the peak holding circuit 5 into a digital signal and outputs the digital signal to the microcomputer 7.

The microcomputer 7 includes a hardware such as a central processing unit (CPU), a memory, a timer counter or the like, and a program to execute functions as described later on.

The microcomputer 7 is supplied at its input terminals $C_H$ and $C_V$ with the horizontal synchronizing signal H and the vertical synchronizing signal V from the synchronizing signal separation circuit 3, respectively. The microcomputer 7 is supplied at its input terminal IN with the digital signal indicative of the peak value from the A/D converter 6.

The microcomputer 7 outputs the timing signal $S_T$ from its output terminal T to the peak holding circuit 5.

The microcomputer 7 of the picture-display-region discriminating apparatus having such arrangement executes processings in accordance with the above predetermined programs, thereby carrying out the following operations;

(1) an operation of setting the picture detection regions;

(2) an operation of controlling an operation of the peak holding circuit 5;

(3) an operation of discriminating whether or not any picture is displayed on each of the above picture detection regions;

(4) an operation of determining which of three values obtained from the above discrimination the level has (ternary determination);

(5) an operation of adjusting the black level; and (6) an operation of comparing detected peak values of the video signal corresponding to the same picture detection region.

(1) The Setting of the Picture Detection Regions

Figure 4:
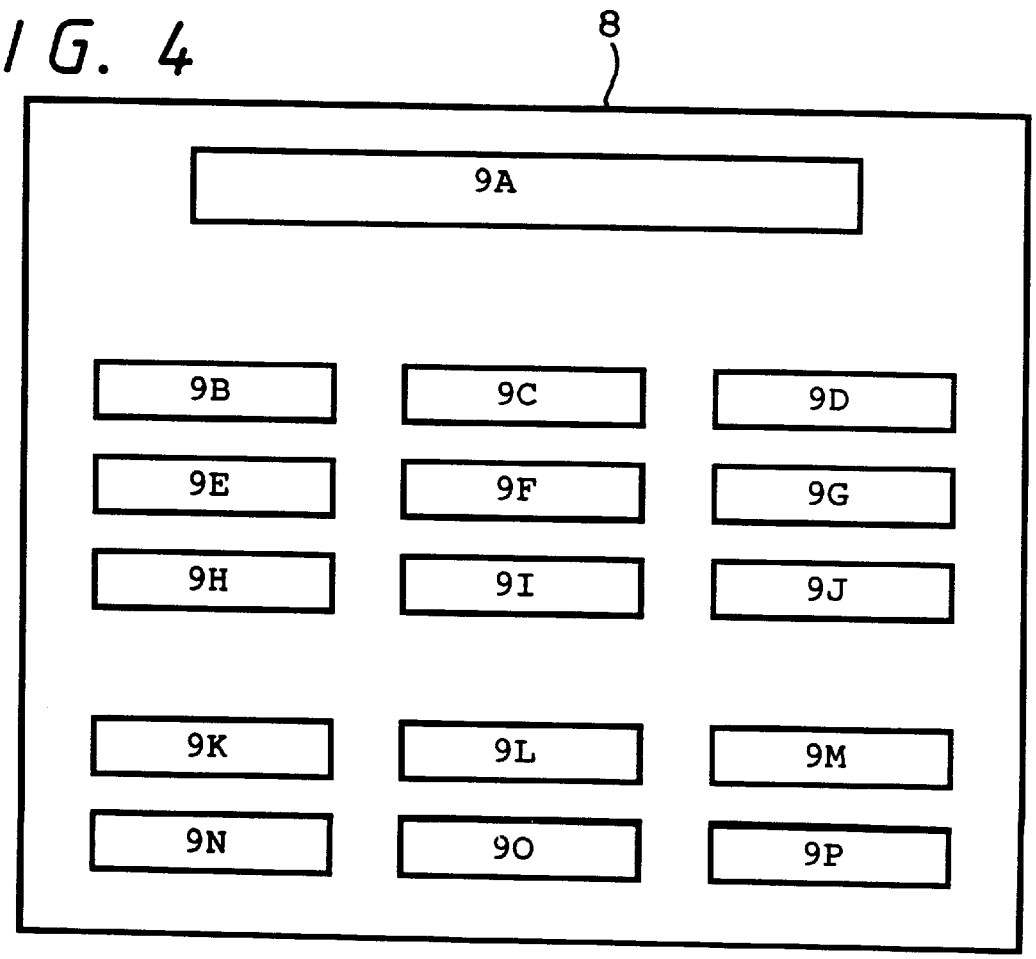
FIG. 4 is a diagram used to explain a setting arrangement of picture detection regions according to the embodiment shown in FIG. 2.

As shown in FIG. 4, the microcomputer 7 sets sixteen picture detection regions 9A to 9P on a picture screen 8 of the television receiver so that the sixteen picture detection regions 9A to 9P should cover the almost entire picture screen 8. The microcomputer 7 sets sampling points at proper points on horizontal scanning lines in each of the picture detection regions 9A to 9P. The microcomputer 7 calculates coordinates of the sampling points in values of time from the horizontal synchronizing signals and stores the calculated values of time in the memory.

While the sixteen picture detection regions 9A to 9P are set on the picture screen 8 in this embodiment, the present invention is not limited thereto and it is sufficient that the picture detection regions are set so as to cover the almost entire picture screen 8.

The horizontally stripe picture detection region 9A of the sixteen picture detection regions 9A to 9P is set on an upper portion of the picture screen 8. It is known that the upper portion of the picture screen 8 is used only for a picture of a standard size with an aspect ratio of 4:3 and becomes a region where no picture is displayed when a picture of other size is displayed.

It is known that a center portion of the picture screen 8 is used for both of the picture of the standard size and a rectangular picture of a Vista Vision size, a Cinema Scope size or the like. The nine small picture detection regions 9B to 9J are densely set on the center portion of the picture screen 8 in columns of three and rows of three.

Since the picture detection regions 9B to 9J are densely set on the center portion of the picture screen 8, it is possible to discriminate every kind of a picture size of a video software, and it is also possible to improve an accuracy in detection of a level of the video signal which corresponds to a center portion of a picture and is changed considerably.

Moreover, on a lower portion of the picture screen 8 where a superimposed dialog is displayed in the case of a foreign movie or the like, the six small picture detection regions 9K to 9P having the same sizes as those of the picture detection regions 9B to 9J are set in columns of three and rows of two.)

(2) Control of the Operation of the Peak Holding Circuit 5

Figures 5A, 5B, 5C:
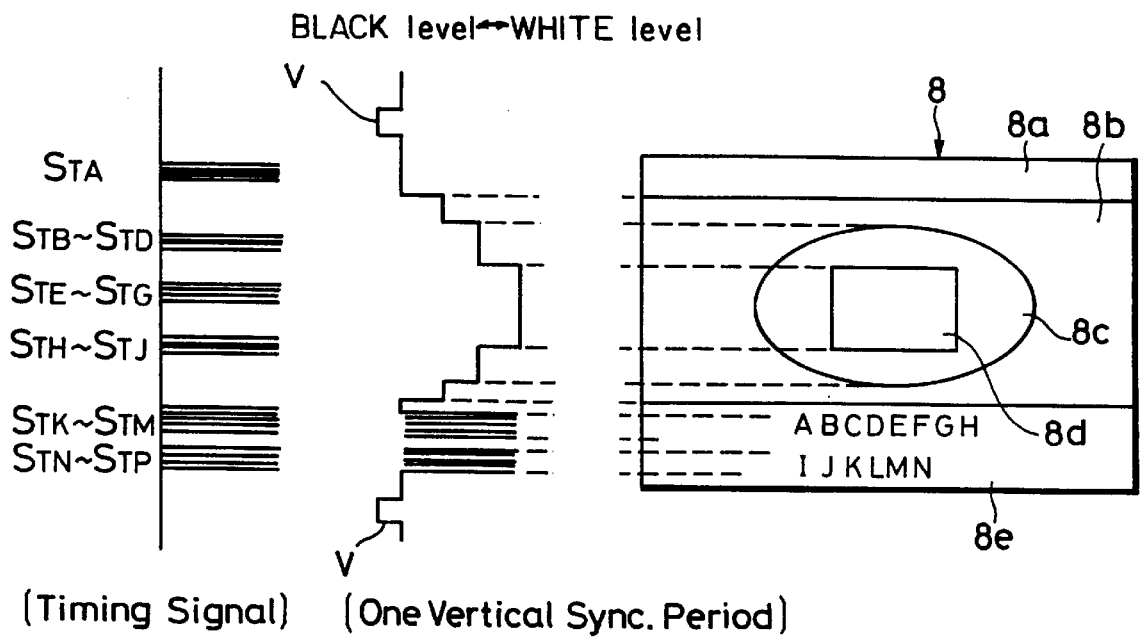
FIGS. 5A to 5D are diagrams used to explain operations of a peak holding circuit according to the embodiment shown in FIG. 2.

As shown in FIG. 5A, the microcomputer 7 supplies timing signals $S_T$ for the picture detection regions 9A to 9P (hereinafter respectively referred to as timing signals $S_{TA}$ to $S_{TP}$) to the peak holding circuit 5 at the sampling points of the picture detection regions 9A to 9P.

Specifically, with reference to the vertical synchronizing signal V, the microcomputer 7 controls its timer counter to start counting every time when the horizontal synchronizing signal H is input thereto from the synchronizing signal separation circuit 3. When a count value of the timer counter is agreed with the coordinate of the sampling point of each of the picture detection regions 9A to 9P, the microcomputer 7 supplies each of the timing signals $S_T$ to $S_P$ to the peak holding circuit 5 as shown in FIG. 5A. When the count value of the timer counter is not agree with any of the coordinates of the set sampling points on the horizontal scanning lines in the picture detection regions 9A to 9P, the microcomputer 7 stops supplying any of the timing signal $S_T$ to $S_{TP}$ to the peak holding circuit 5.

The peak holding circuit 5 includes a register for temporarily storing a detected voltage value of the sampling point. In response to each of the timing signals $S_{TA}$ to $S_{TP}$ from the microcomputer 7, the peak holding circuit 5 detects a voltage value of the sampling point and temporarily stores them in the register. The peak holding circuit 5 compares the detected voltage value at the present sampling point with a voltage value detected at a preceding sampling point and temporarily stored in the register, and stores a larger voltage value in the register based on the compared result. Thus, the register can store the maximum value of the voltage values detected at all the sampling points in each of the picture display regions 9A to 9P. The peak holding circuit 5 outputs a signal indicative of this maximum value to the A/D converter 7.

FIG. 5C shows a simple example of a picture obtained when a picture of a foreign movie of Cinema Scope size for the standard television receiver is displayed as it is on the picture screen 8 of the wide screen television receiver. The picture size of the picture is not enlarged in the frame height direction and hence the displayed picture is not enlarged in the frame height direction sufficiently.

FIG. 5B shows luminance levels of the video signal corresponding to portions of a picture displayed on the picture screen 8. Specifically, an upper portion 8a of the picture screen 8 is a portion where no picture is displayed. A slightly dark background portion 8b is displayed at the center of the picture screen 8. An elliptical portion 8c is displayed at the center of the slightly dark background portion 8b. A brighter rectangular portion 8d is displayed in the elliptical portion 8c. A superimposed dialogue portion 8e is brightly displayed on a dark lower portion of the picture screen 8.

Figure 5D:
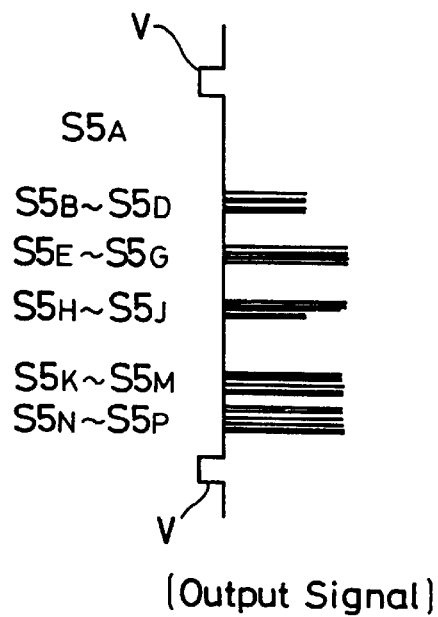

When such picture is displayed on the picture screen 8, as shown in FIG. 5D, the peak holding circuit 5 outputs output signals $S5_A$ to $S5_P$ indicative of the luminance levels shown in FIG. 5B based on the timing signals $S_{TA}$ to $S_{TP}$ shown in FIG. 5A. The output signals $S5_A$ to $S5_P$ respectively correspond to the picture display regions 9A to 9P.

Specifically, in this case, since the upper portion 8a is the portion where no picture is displayed, the peak holding circuit 5 does not output the output signal $S5_A$, based on the timing signal $S_{TA}$ shown in FIG. 5A. Based on the timing signals $S_{TB}$ to $S_{TD}$ shown in FIG. 5A, the peak holding circuit 5 outputs the output signals S5B to $S5_D$ corresponding to the slightly dark background portion 8b and having substantially middle values of the luminance levels between the black level and the white level. Based on the timing signals $S_{TE}$ to $S_{TG}$ and the timing signals $S_{TH}$ o $S_{TJ}$ the peak holding circuit 5 respectively outputs the output signals $S5_E$ to $S5_G$ and the output signals $S5_E$ to $S5_J$ which correspond to the bright elliptical portion 8c and the brighter rectangular 8d and have luminance levels substantially close to the white level. Based on the timing signals $S_{TK}$ to $S_{TM}$ and the timing signals $S_{TN}$ to $S_{TP}$, the peak holding circuit 5 respectively outputs the output signals $S5_K$ to $S5_M$ and the output signals $S5_N$ to $S5_P$ corresponding to the superimposed dialogue 8e and having the luminance levels at the white level. The thus obtained signals indicative of luminance levels are employed as data for discrimination of existence or absence of the picture.

(3) Determination of Existence of Absence of a Picture

The microcomputer 7 stores a plurality of reference levels in the memory.

The microcomputer 7 compares the digital signal output from the A/D converter 6 with the reference levels to discriminate the luminance levels of the video signals corresponding to the picture display regions 9A to 9P. Based on discriminated results, the microcomputer 7 determines whether or not any picture is displayed on each of the picture display regions 9A to 9P. Based on results of the determination, the microcomputer 7 discriminates the kind of a picture size of the displayed picture in accordance with a predetermined picture-size discriminating algorithm, for example, thereby selecting a display mode. When the microcomputer 7 determines whether or not any display is displayed on a region corresponding to the superimposed dialogue portion 8e, the white level is also detected and the microcomputer 7 employs not only the black level but also the white level for the above determination, which improves reliability of the discrimination.

(4) Ternary Determination

When the microcomputer 7 discriminates existence or absence of the picture in the above determination of existence or absence of a picture, the microcomputer 7 carries out a so-called ternary determination, i.e., it employs the two different reference values WL, BL of the reference levels as shown in FIG. 3 to determine which region of the regions higher than the white level, lower than the black level, and between the white and black levels the level of the video signal falls in. When only the black level is employed as the reference level, if the black level is higher, then the microcomputer 7 erroneously determines a region where any picture is displayed as the region where no picture is displayed. Thus, this ternary determination can prevent such erroneous determination. Accordingly, this determination can improve an accuracy in determination of existence or absence of any displayed picture.

(5) Adjustment of the Black Level

Figure 6A:
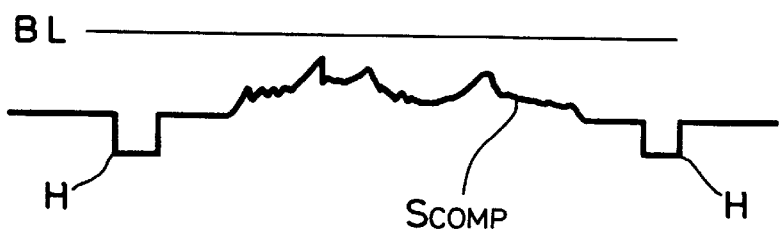
FIGS. 6A and 6B are explanatory diagrams showing signal levels obtained when a reference level is changed in the embodiment shown in FIG. 2.
Figure 6B:

When the microcomputer 7 lowers the reference value BL of the black level stored in the memory subject to some conditions, it is possible to adjust the video signal whose luminance levels are all discriminated as levels lower than the black level as shown in FIG. 6A, and, as shown in FIG. 6B, it is possible to detect the luminance level higher than the black level from the video signal shown in FIG. 6A. Such adjustment can be easily realized only by changing contents of the memory of the microcomputer 7.

(6) Comparison of Detected Values Obtained from a Video Signal Corresponding to the Same Picture Detection Region The microcomputer 7 stores the peak values detected from the video signal corresponding to the same picture detection region in the memory for a predetermined time, thereby storing change of the video signal corresponding to the picture detection region. Therefore, it is possible to detect the picture whose luminance level is not changed considerably, by comparing the peak values obtained within the predetermined time.

While the number, positions and sizes of the picture detection regions 9A to 9P are set in this embodiment as shown in FIG. 4, the present invention is not limited thereto and the number, positions and sizes thereof can be easily changed in accordance with the program stored in the microcomputer 7.

The picture-display-region discriminating apparatus according to this embodiment may commonly use the video amplifier 2, the synchronizing signal separation circuit 3, and the pedestal clamp circuit 4 of the television receiver in which the picture-display-region discriminating apparatus is provided.

As described above, with proper combination of the ternary determination, the adjustment of the black level, the temporal recording of the peak values and so on, it is possible to very accurately discriminate whether or not the picture detection region is the portion where no picture is displayed or the portion where any picture is displayed.

As described above, according to the picture-display-region discriminating apparatus of the present invention, since it is detected with reference to the black level and the white level whether or not any picture is displayed on each of the picture detection regions 9A to 9P disposed so as to cover the almost entire picture screen 8 of the television receiver, it is possible to carry out the ternary determination and to determine that any picture is displayed on the picture detection region but the superimposed dialogue is not displayed thereon.

Since the reference value of the black level can properly be set and changed, it is possible to optionally lower the reference value of the black level when the level of the video signal having a low black level is discriminated, for example. This leads to a increased sensitivity of the black level.

Moreover, since the peak value is compared with the previous peak value and the compared result is stored for a predetermined time, it is possible to detect the video signal whose luminance level is not changed considerably, with a simple means.

Having a described preferred embodiment of the present invention with reference to the accompanying drawings, it is to be understood that the present invention is not limited to the above-mentioned embodiment and that various changes and modifications can be effected therein by one skilled in the art without departing from the spirit or scope of the present invention as defined in the appended claims.

What is claimed is:

1. A picture-display-region discriminating apparatus comprising:

means for setting a number of picture detection regions on a display screen of a television receiver;

detecting means for detecting a level of a video signal representative of a plurality of pictures corresponding to each picture detection region by utilizing two reference levels, in which one of the reference levels is a black level of a luminance signal of the video signal and the other reference level is a white level of the luminance signal of the video signal, and in which said detecting means includes means for storing a maximum value of the video signal of a previous picture and means for comparing a maximum value of the video signal of a present picture with said maximum value of the video signal of the previous picture; and determining means for determining whether or not a picture exists in each said picture detection region based on detection results from said detecting means.

2. A picture-display-region discriminating apparatus according to claim 1, wherein the black reference level can be changed and set properly.

3. A picture-display-region discriminating apparatus according to claim 1, wherein said level of the video signal corresponding to a picture detection region where a superimposed dialogue is displayed on a screen is detected with reference to said black level and said white level.

4. A picture-display-region discriminating apparatus according to claim 1, wherein when said level of the video signal is detected with reference to said black level and said white level, two different reference levels thereof are set, thereby a ternary determination being carried out.

5. A picture-display-region discriminating apparatus according to claim 4, wherein said two different reference levels can be changed and set properly.

6. A picture-display-region discriminating apparatus according to claim 1, wherein said detecting means stores a change of sampled video signals for a predetermined time.

* * * * *